US007185554B2

(12) United States Patent  (10) Patent No.: US 7,185,554 B2
Ronge  (45) Date of Patent: Mar. 6, 2007

(54) SHIFTING DEVICE FOR A MULTI-STEP MANUAL TRANSMISSION

(75) Inventor: Ludger Ronge, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 588 days.

(21) Appl. No.: 10/482,552

(22) PCT Filed: Jul. 23, 2002

(86) PCT No.: PCT/EP02/08179

§ 371 (c)(1),
(2), (4) Date: Dec. 30, 2003

(87) PCT Pub. No.: WO03/012320

PCT Pub. Date: Feb. 13, 2003

(65) Prior Publication Data

US 2004/0177714 A1 Sep. 16, 2004

(30) Foreign Application Priority Data

Jul. 28, 2001 (DE) ................................ 101 37 068

(51) Int. Cl.
 *F16H 63/20* (2006.01)
(52) U.S. Cl. ................... 74/473.25; 74/473.24
(58) Field of Classification Search ............. 774/473.1, 774/473.21, 473.24, 473.25
See application file for complete search history.

(56) References Cited

U.S. PATENT DOCUMENTS 4,320,670 A  3/1982  Kawamoto ................... 74/477

FOREIGN PATENT DOCUMENTS

| DE | 30 03 076 C2 | 7/1985 |
| DE | 198 43 584 A1 | 3/2000 |
| DE | 200 21 183 U1 | 4/2001 |
| WO | 01/31233 A1 | 5/2001 |

*Primary Examiner*—William C. Joyce
(74) *Attorney, Agent, or Firm*—Davis Bujold & Daniels, P.L.L.C.

(57) ABSTRACT

In a shifting device (2) for a multi-step transmission, several shift couplings are arranged one behind another, each with a shifting sleeve, can alternately be engaged in each case, via a shift rocker arm (4, 6, 8, 10), in that first form enclosed elements (30, 32, 34, 36) are arranged on a swivelling and axially movable selector and gearshift shaft (24) in such manner that at predetermined swivel angles of the selector and gearshift shaft (24) in each case only one first form enclosed element (30, 32, 34, 36) cooperates with one second form enclosing element (38, 40, 42, 44) which is arranged on a shift rocker arm (4, 6, 8, 10), and in that via an axial displacement of the selector and gearshift shaft (24), the appropriate shift rocker arm (4) is actuated while during its actuation, the other shift rocker arms (6, 8, 10) are locked in their neutral position by a locking device, the locking device comprises a locking sleeve (66, 74, 82, 86) which is provided on the selector and gearshift shaft (24) for respective pairs of shift rocker arms (4, 6, 8, 10) and is connected rotationally fast to the selector and gearshift shaft (24) but can move axially on the selector and gearshift shaft (24) and, on each shift rocker arm (4, 6, 8, 10), there are arranged first locking member (50, 52, 54, 56) which cooperate with the locking sleeve (66, 74, 82, 86) and with second locking member (58, 60) in fixed arrangement in the transmission.

8 Claims, 7 Drawing Sheets

SHIFTING DEVICE FOR A MULTI-STEP MANUAL TRANSMISSION

This application is a national stage completion of PCT/EP02/08179 filed Jul. 23, 2002 which claims priority from German Application Serial No. 101 37 068.7 filed Jul. 28, 2001.

FIELD OF THE INVENTION

The invention concerns a shifting device for a multi-step transmission.

BACKGROUND OF THE INVENTION

In multi-step manual transmissions for vehicles, which are shifted with interruption of the traction force, i.e., in which an input shaft of the transmission is disengaged from a drive engine by a clutch during the shifting process, the respective gear can be engaged by a form-enclosing shift coupling in that the shift gear teeth of a sliding sleeve are pushed into the coupling gear teeth of a coupling body attached to a gear element to be engaged, for example, to a gear wheel or a transmission housing. When this is done, the torque, in the engaged condition, is transmitted from a gear element via the coupling body, the coupling gear teeth, the shift gear teeth, the sliding sleeve and the sleeve guide, to another gear element, for example, a gear wheel or a shaft, or supported on the transmission housing.

The gear engaged determines the transmission ratio and hence also the speed ratio between the input shaft and the output shaft of the transmission. The uncoupled gear elements, for example, free-running gear wheels of the other gears in mutual engagement, run with a speed difference relative to the engaged gear elements which corresponds to their transmission ratio. When changing from one gear to another, during the shift the components to be coupled must be brought to approximately the same speed before the gear teeth of the sliding sleeve can engage in the coupling gear teeth of the coupling body to be engaged. For this, synchromeshes are used.

The gears are formed of gear wheel assemblies arranged one behind the other, between which there are shift couplings. These are actuated by a shifting device alternately as appropriate for the preselected gear. During this, care must be taken that two shift couplings are not actuated at the same time, because that could damage the transmission, while at the least unpleasant noise is generated and the traction force is interrupted for an undesirably long time. In emergency situations this can have dangerous consequences.

From DE 198 43 584 A1, a shifting device of the type mentioned is known, the full content of which is included herein. To ensure that in every case only one shift coupling is actuated while the other shift couplings remain locked in their neutral position during the shift, a locking shaft arranged parallel to the gearshift shaft is provided, which can be rotated with the gearshift shaft but is arranged axially fixed in the housing. For the locking shaft, a separate suspension must be provided in the gearbox, and room for movement as well as structural space for the locking shaft must also be provided.

The purpose of the present invention is to provide a shifting device for a multi-step transmission, which ensures secure locking of disengaged shift couplings while taking up little structural space.

SUMMARY OF THE INVENTION

A shifting device of a multi-step transmission is proposed, with which several shift couplings arranged axially one behind another, each with a sliding sleeve, can be alternately engaged in each case by means of a shift rocker arm. For this, first form-enclosed elements are arranged on a selector and gearshift lever that can be swivelled and moved axially in the transmission housing in such manner that, at predetermined swivel angles of the selector and gearshift shaft, in each case only a first form-enclosed element cooperates with a second form-enclosing element, the latter arranged on a shift rocker arm. In this, axial displacement of the selector and gearshift shaft actuates the appropriate shift rocker arm. The other shift rocker arms are locked in their neutral positions by a locking device during the said actuation, the locking device having a locking sleeve. This locking sleeve is provided on the selector and gearshift shaft for respective pairs of shift rocker arms, and is connected to the selector and gearshift shaft rotationally fast but able to move axially on it. On each shift rocker arm is arranged a first locking element, which cooperates with the locking sleeve, and a second locking element, the latter arranged in fixed position in the transmission. In an advantageous embodiment, the locking sleeve has internal gear teeth which can move axially on outer gear teeth of the selector and gearshift shaft. In a second advantageous design, the locking sleeve has axial internal grooves in which a pin fixed on the selector and gearshift shaft engages. In one embodiment, openings are provided in the first and second locking elements, in which a check disk of the locking sleeve engages. In one design the check disk is of oval shape. This allows space to be saved in the direction of the shift couplings, compared to a disk of purely circular shape. In a design version the second form-enclosing element and the first locking element on the shift rocker arms are formed on the same component. Preferably, the second locking elements are formed in fixed positions in the transmission housing. In another design the second locking elements are arranged on covers that can be fixed to the transmission housing and are accessible from outside the transmission. In this, the covers on the transmission housing can be displaced by a limited amount, whereby fine adjustment of the second locking element can be carried out.

BRIEF DESCRIPTION OF THE DRAWINGS

The invention will now be described, by way of example, with reference to the accompanying drawings in which.

DETAILED DESCRIPTION OF THE INVENTION

Figure 1:
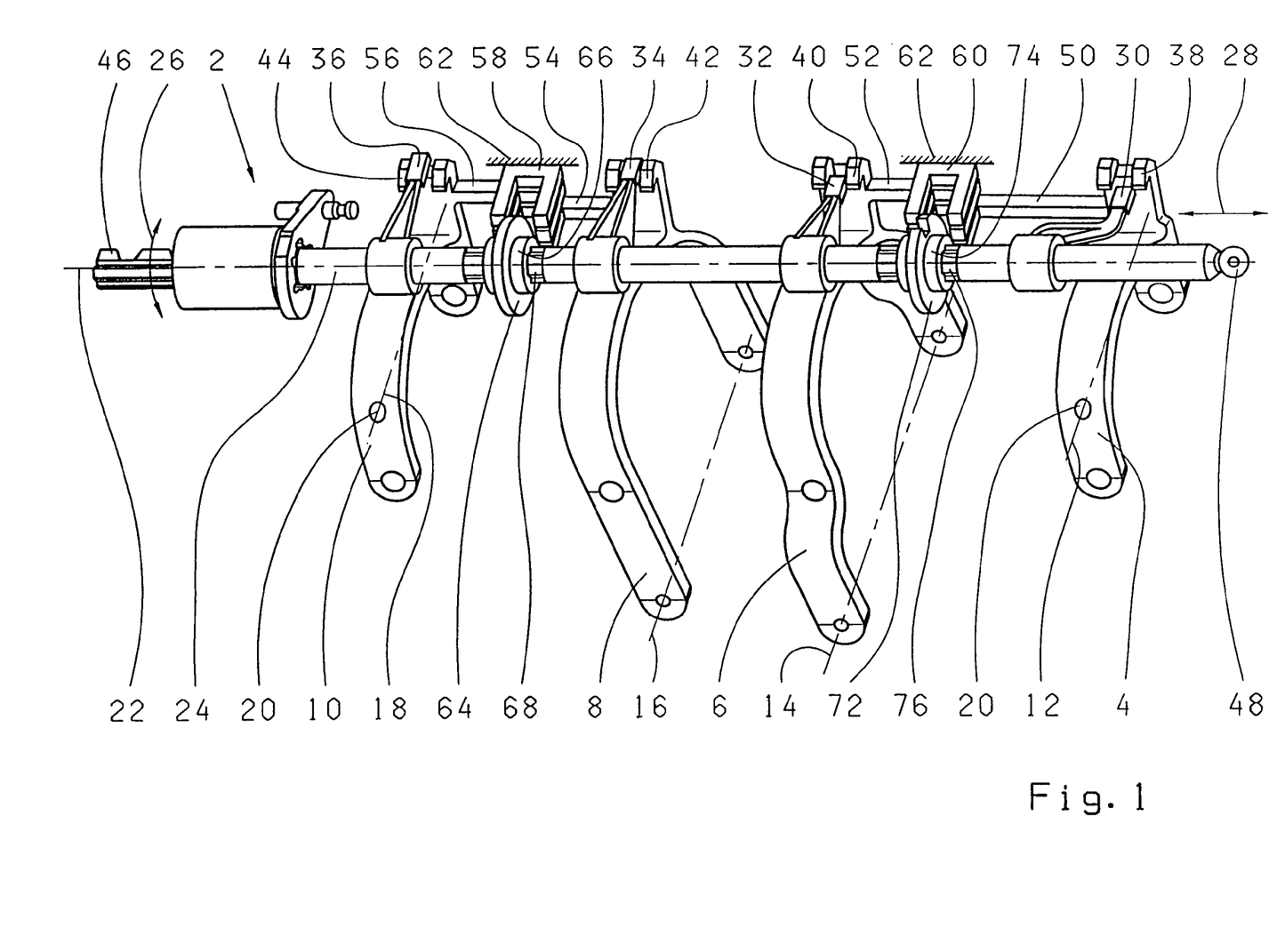
FIG. 1 is a view of the shifting device from above.

A shifting device 2 has four shift rocker arms 4, 6, 8, 10 mounted to swivel within a transmission housing (not shown in more detail) about swivel axes 12, 14, 16, 18 respectively. The shift rocker arms 4, 6, 8, 10 are of fork-like design and have a bearing bores 20 in the area of their fork-like ends in which slide blocks (not shown) are mounted and can rotate, which are fitted in circumferential grooves of shift sleeves of associated shift couplings. The shift couplings (also not shown) rotate about an axis 22. Transversely to the swivel axes 12, 14, 16, 18 is arranged a selector and gearshift shaft 24, which is mounted in the transmission housing to swivel about the axis 22 in a swivel direction 26 and can move axially in the shift direction 28.

On the selector and gearshift shaft 24 are fixed shift fingers 30, 32, 34, 36 arranged at angular offsets relative to one another. When the selector and gearshift shaft 24 swivels, the shift fingers 30, 32, 34, 36 individually engage one after another with fork-shaped claws 38, 40, 42, 44 attached to the shift rocker arms 4, 6, 8, 10. The shift rocker arms 4, 6, 8, 10 and the shift fingers 30, 32, 34, 36 are, respectively, associated with individual gears. For example, the shift rocker arm 4 is provided for reverse gear, the shift rocker arm 6 for the first and the second gears, the shift rocker arm 8 for third and fourth gears, and the shift rocker arm 10 for the fifth and the sixth gears.

The shifting device 2 is shown in a neutral shift position with the selector and gearshift shaft 24 swivelled such that, in this case for example, the shift gate for third and fourth gear is selected since the shift finger 34 is engaged in the claw 42. If the selector and gearshift shaft 24 is now moved in one of the two shift directions 28, the third or fourth gear will be engaged since, by means of the shift rocker arm 8, the corresponding shift coupling will be pressed home. In the shift position the selector and gearshift shaft 24 can be locked by detent grooves 46. The selector and gearshift shaft 24 is swivelled and moved axially by means of a rod, which engages in a ball element 48 on the selector and gearshift shaft 24.

Figure 7A:
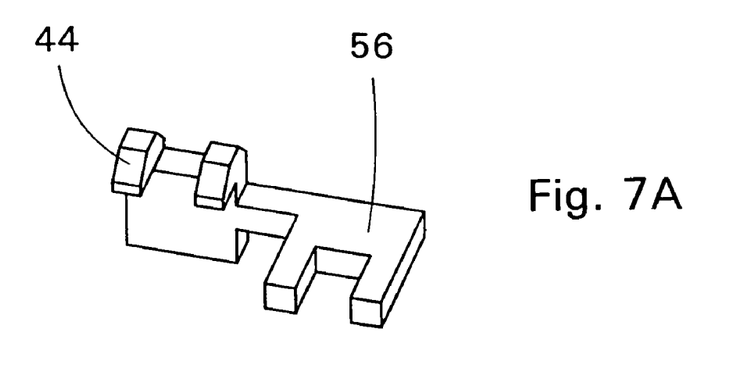
FIGS. 7A, 7B and 7C are illustrations of locking elements.
Figure 7B:
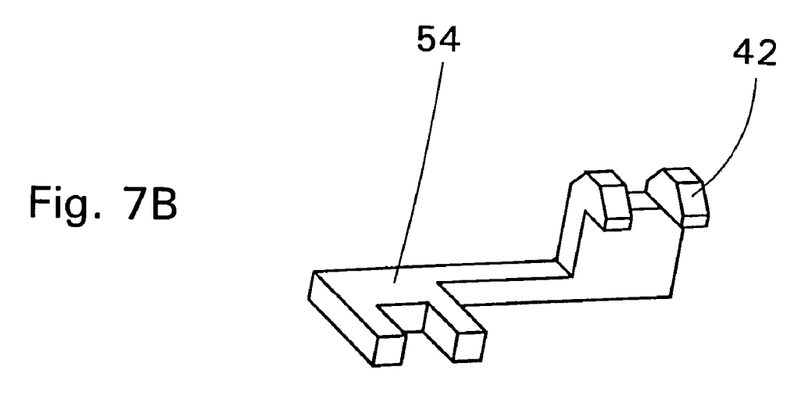
Figure 7C:
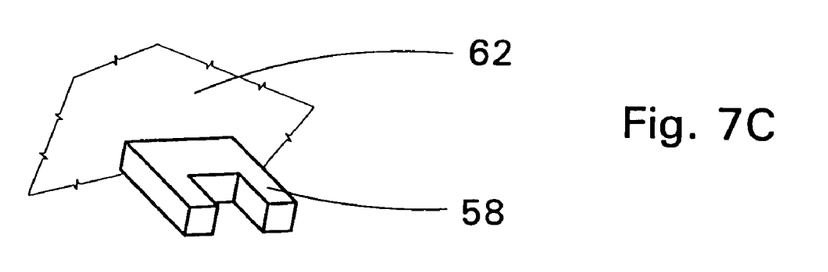

So that only the selected shift rocker arm 8 will be actuated during shifting, the other shift rocker arms 4, 6 and 10 must be locked. For this, on each of the shift rocker arms 4, 6, 8, 10 a respective further claw 50, 52, 54, 56 is provided as a first blocking means. FIGS. 7A. 7B and 7C show the claw 56 and the claw 54 which, in each case, form a single component with the claws 44 and 42, respectively, the said components being arranged on the shift rocker arms 8 and 10, respectively. The openings of the claws 54 and 56 are covered by an opening of a further claw 58, while the openings of the claws 50 and 52 are covered by the opening of a claw 60. The claws 50, 52 and 60 or 54, 56 and 58 lie one over another on a segment of a curve around the selector and gearshift shaft 24. The claws 58 and 60 are arranged fixed in the transmission housing 62 and form a second blocking means.

A check disk 64 of a locking sleeve 66 engages in the openings of the claws 54, 56 and 58. The check disk 64 and the locking sleeve 66 are connected fast to one another. The locking sleeve 66 is arranged on gear teeth 68 rotationally fast on the selector and gearshift shaft 24. However, the locking sleeve 66 can move axially over the gear teeth 68 on the selector and gearshift shaft 24 or the latter can move within the locking sleeve 66 along the axis 22. An opening 70 is provided in the check disk 64, which can be seen in FIGS. 3A, 3B, 3C and 3D.

A check disk 72 of a locking sleeve 74 engages in the openings of the claws 50, 52 and 60. The check disk 72 and locking sleeve 74 are connected fast to one another. The locking sleeve 74 is arranged on gear teeth 76 rotationally fast on the selector and gearshift shaft 24. However, the locking sleeve 74 can move axially over the teeth 76 on the selector and gearshift shaft 24 or the latter can move within the locking sleeve 76 along the axis 22. An opening 78 is provided in the check disk 72, which can be seen in FIGS. 2A, 2B, 2C and 2D. The check disks 64 and 72 are fixed by the claws 58 and 60 in the axial direction along the rotation axis 22 relative to the transmission housing 62.

A shift process will now be described with reference to FIGS. 2A, 2B, 2C, 2D and FIGS. 3A, 3B, 3C, 3D. FIGS. 2C and 3C represent the selector position of the selector and gearshift shaft 24 for the shift gate 1/2, in which the gearshift lever is usually in neutral. The check disk 72 is shown in FIG. 2C and the check disk 64 in FIG. 3C. In this selector position, to engage gears 1 and 2 the selector and gearshift shaft 24 can now be moved along the axis 22 in shift directions 28, corresponding in FIGS. 2 and 3 to a movement into or out of the plane of the drawing. In FIG. 2C the opening 78 is covered by the claw 52, so that the claw 52 can pass through the opening 78 and is not impeded in its movement by the check disk 72. The check disk 72 itself is held fast by the claw 60 and the claw 50 is not in front of the opening 78, so that this too is fixed by the check disk and the claw 60 relative to the housing. This selector position means for the check disk 64 in FIG. 3C that the opening 70 is not covered by any of the claws 54, 56, 58 there, so that all these claws 54, 56, 58 are fixed relative to the housing by the claw 58 via the check disk 64.

Figures 2A, 2B:
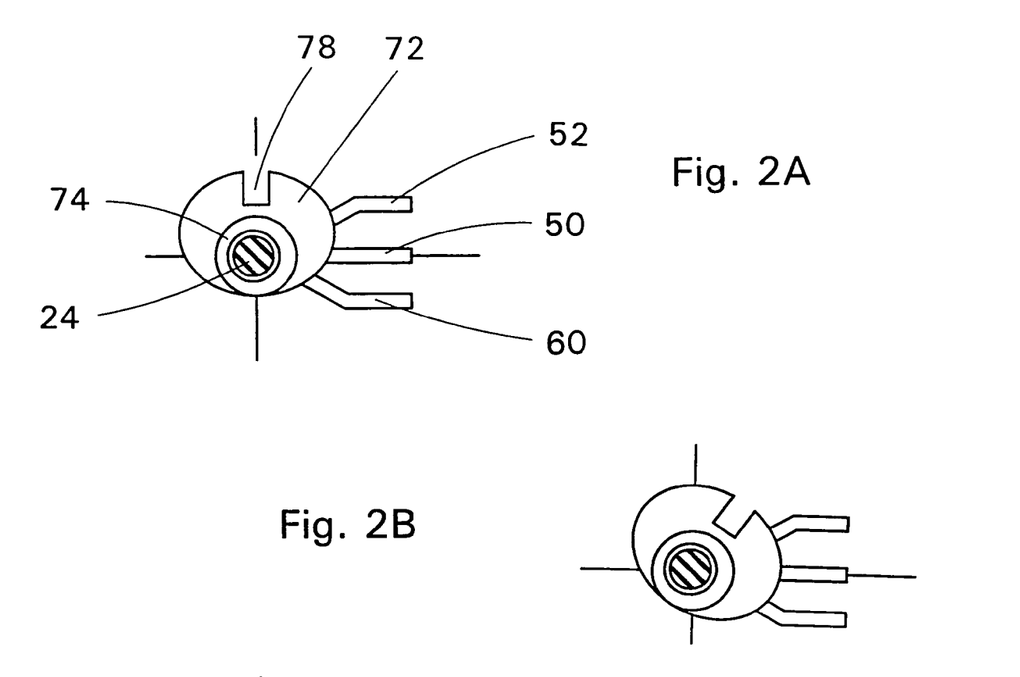
FIGS. 2A, 2B, 2C and 2D are sectional views through various shift positions of a first locking sleeve according to FIG. 1.
Figure 2C:
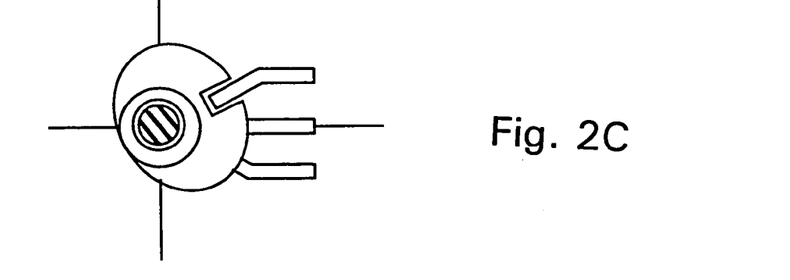
Figure 2D:
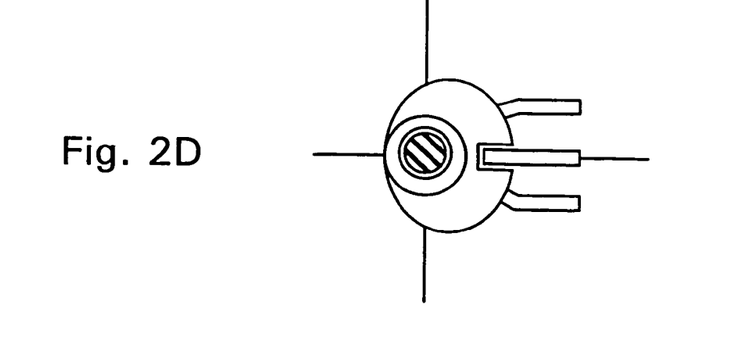
Figure 3A:
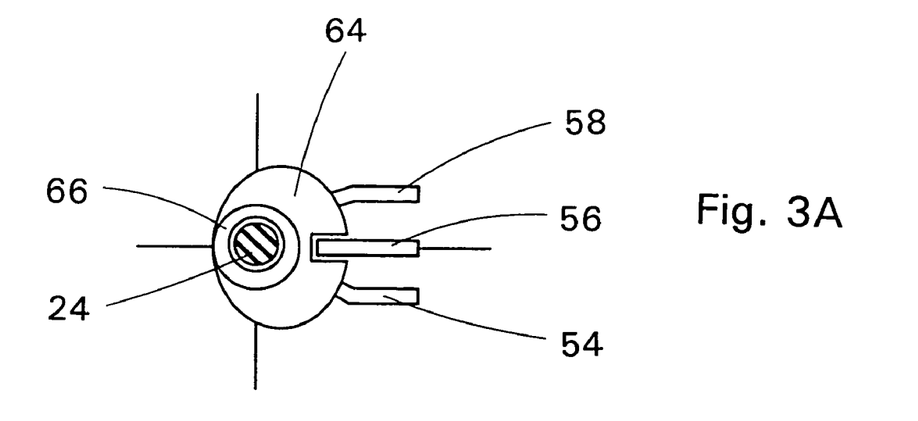
FIGS. 3A, 3B, 3C and 3D are sectional views through various shift positions of a second locking sleeve according to FIG. 1.
Figure 3B:
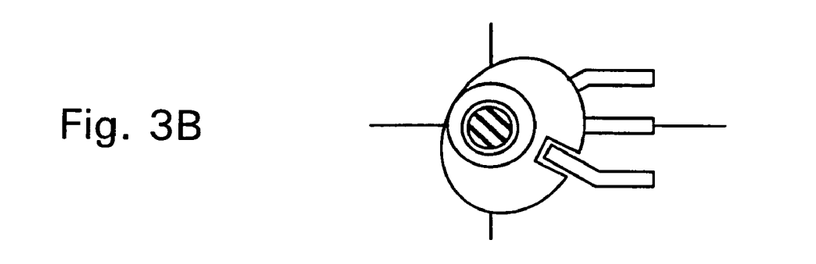
Figure 3C:
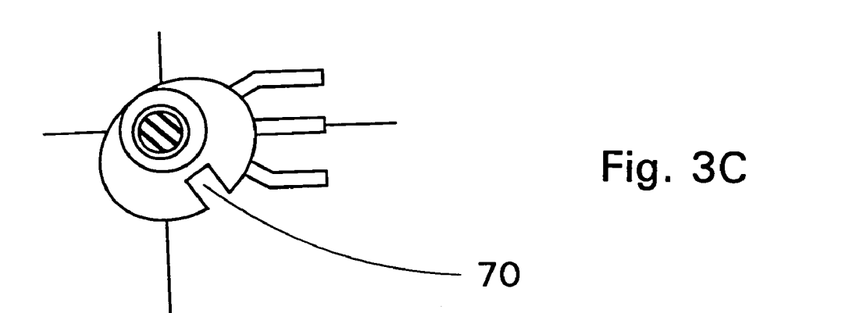
Figure 3D:
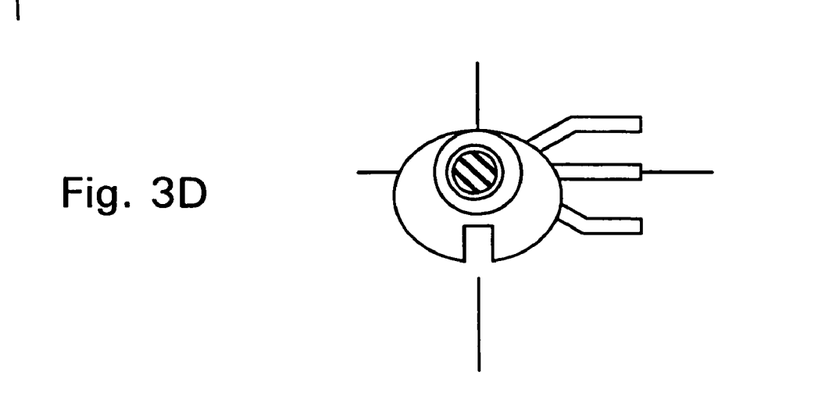

If a change is now made to the shift gate for the third and fourth gears, then in the neutral position the selector and gearshift shaft 24 is swivelled in swivel direction 26, corresponding to a rotation to the left in FIGS. 2A, 2B, 2C, 2D and FIGS. 3A, 3B, 3C, 3D. The shift finger 32 then leaves its covering position with the claw 40 and the shift finger 34 moves to a covering position with the claw 42 on shift rocker arm 8. Movement of the selector and gearshift shaft 24 in shift direction 28 now allows the shift rocker arm 8 to move. This corresponds to a swivel position of the selector and gearshift shaft 24 that can be seen in FIGS. 2B and 3B. The claw 54 on the shift rocker arm 8 is covered in FIG. 3B by the opening 70 in the check disk 64. The other claws 56 and 58 in FIG. 3B are blocked by the check disk 64. Likewise, in this position according to FIG. 2B, the claws 50, 52 and 56 are blocked by the check disk 72.

If a change is now made to the shift gate for the fifth and sixth gears, then in the neutral position the selector and gearshift shaft 24 is swivelled in swivel direction 26, corresponding in FIGS. 2A, 2B, 2C, 2D and FIGS. 3A, 3B, 3C, 3D to a further rotation to the left. The shift finger 34 leaves its covering position with the claw 42 and the shift finger 36 moves to a covering position with the claw 44 on shift rocker arm 10. By virtue of a movement of the selector and gearshift shaft 24 in the shift direction 28, the shift rocker arm 10 can now move. This corresponds to a swivel position of the selector and gearshift shaft 24 as shown in FIGS. 2A and 3A. The claw 56 on the shift rocker arm 10 is covered in FIG. 3A by the opening 70 in the check disk 64. The other claws 54 and 58 in FIG. 3A are blocked by the check disk 64. Likewise, in this position, the claws 50, 52 and 56 in FIG. 2A are blocked by the check disk 72.

Finally, if a change is now made to the shift gate for reverse gear, then in the neutral position the selector and gearshift shaft 24 is swivelled in swivel direction 26, corresponding in FIGS. 2A, 2B, 2C, 2D and FIGS. 3A, 3B, 3C, 3D to a rotation to the right. The shift finger 36 then leaves its covering position with the claw 44 and the shift finger 30 moves to a covering position with the claw 38 on shift rocker arm 4. Movement of the selector and gearshift shaft 24 in shift direction 28 now allows the shift rocker arm 4 to move. This corresponds to a swivel position of the selector and gearshift shaft 24 shown in FIGS. 2D and 3D. In FIG. 2D, the claw 50 on the shift rocker arm 4 is covered by the opening 70 in the check disk 72. The other claws 52 and 60 in FIG. 2D are blocked by the check disk 78. Likewise, in this position, according to FIG. 3D, the claws 54, 56 and 58 are blocked by the check disk 64.

Figure 4:
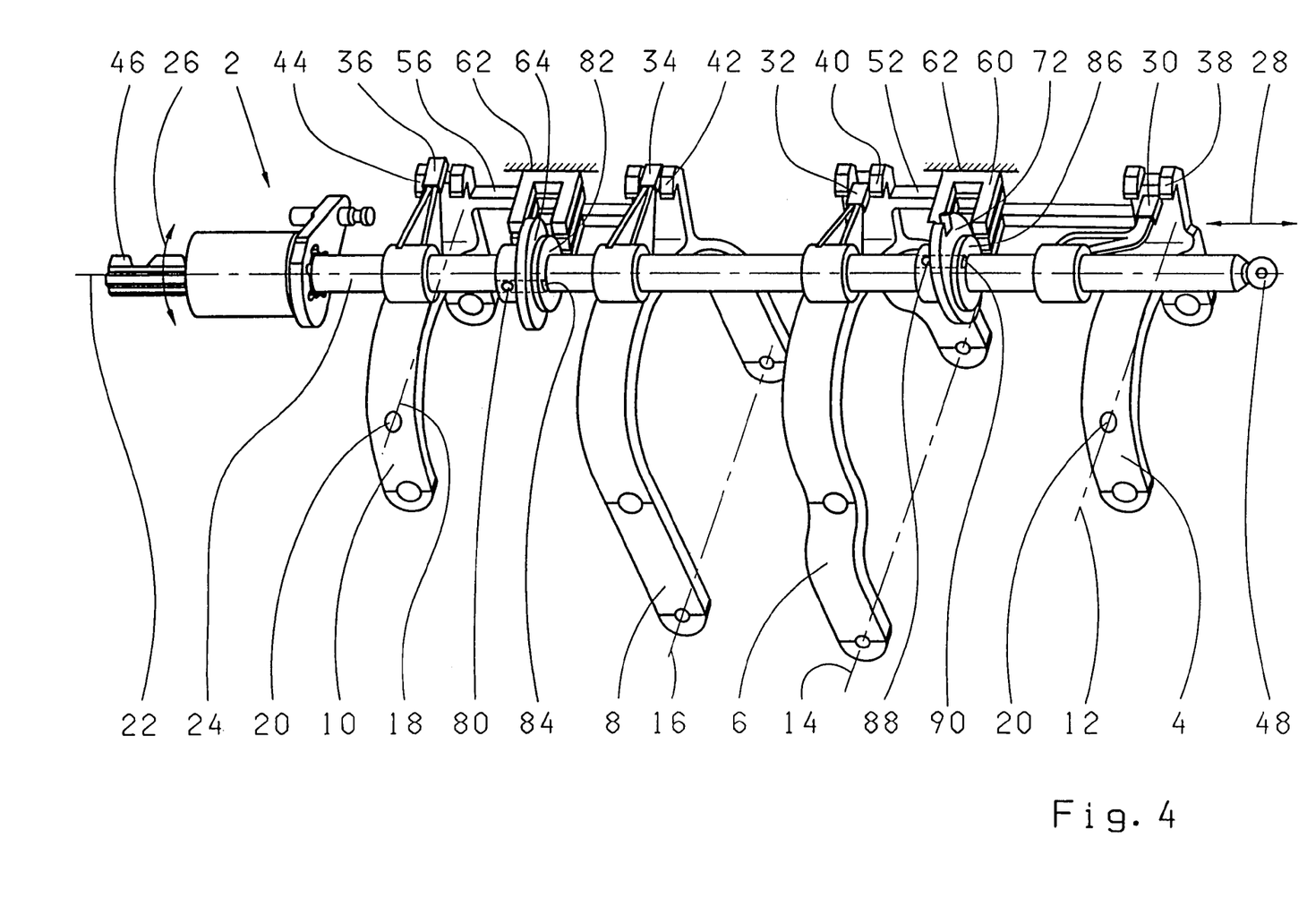
FIG. 4 is a view of a modified shifting device according to FIG. 1, from above.
Figure 5A:
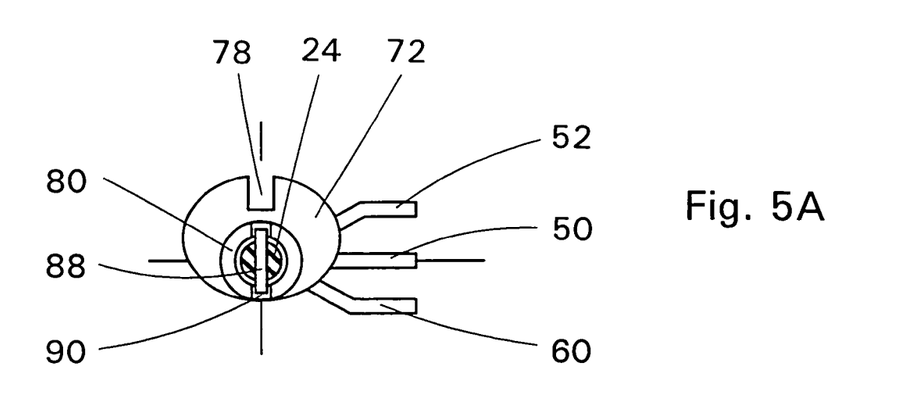
FIGS. 5A, 5B, 5C and 5D are sectional views through various shift positions of a first locking sleeve according to FIG. 4.
Figure 5B:
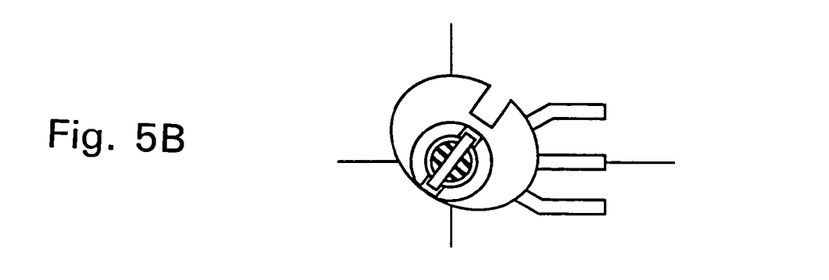
Figure 5C:
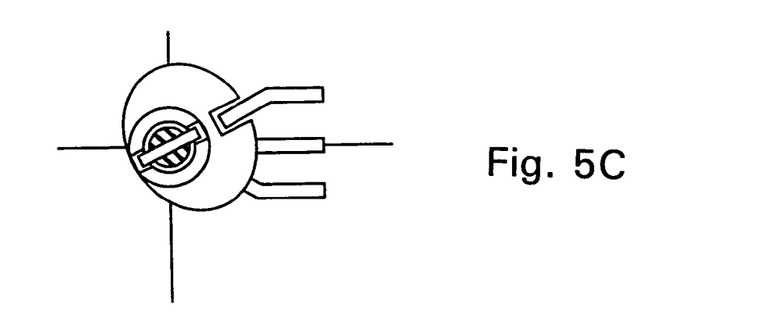
Figure 5D:
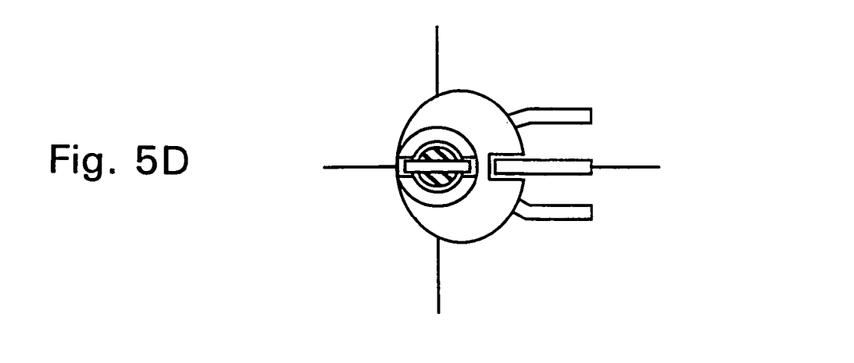
Figure 6A:
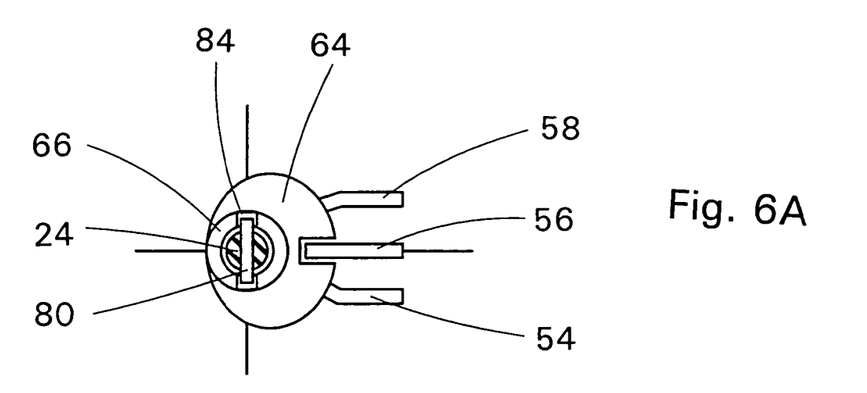
FIGS. 6A, 6B, 6C and 6D are sectional views through various shift positions of a second locking sleeve according to FIG. 4.
Figure 6B:
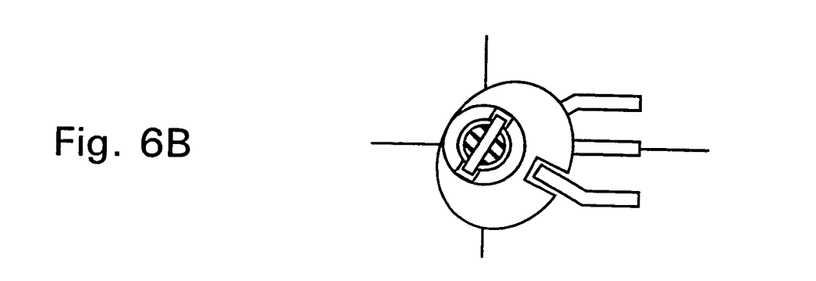
Figure 6C:
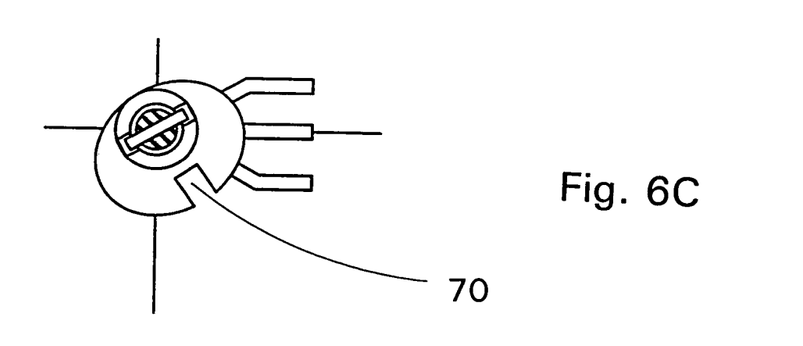
Figure 6D:
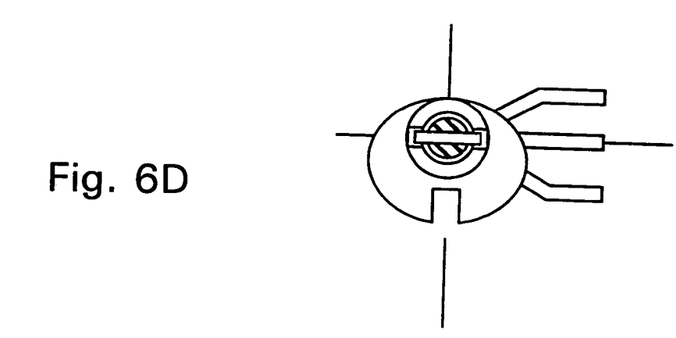

FIG. 4 shows a locking sleeve 82 modified in relation to FIG. 1. In FIG. 4, a pin 80 passes through the selector and gearshift shaft 24 and can move in a groove 84 within a locking sleeve 82 along the axis 22. Because of this, the locking sleeve 82 is connected rotationally fast to the selector and gearshift shaft 24, while the latter can be moved axially within the locking sleeve 82. Correspondingly, a locking sleeve 86, modified in relation to FIG. 1, is provided. In FIG. 4, a pin 88 passes through the selector and gearshift shaft 24 and can move in a groove 90 within the locking sleeve 86 along the axis 22. This can be seen in section in FIGS. 5A, 5B, 5C, 5D and FIGS. 6A, 6B, 6C, 6D. The shift processes correspond to those described in relation to FIGS. 2A, 2B, 2C, 2D and FIGS. 3A, 3B, 3C, 3D.

REFERENCE NUMERALS 2 shifting device
4 shift rocker arm
6 shift rocker arm
8 shift rocker arm
10 shift rocker arm
12 swivel axis
14 swivel axis
16 swivel axis
18 swivel axis 64 check disk
20 bearing bores 66 locking sleeve
22 rotation axis 68 gear teeth
24 selector and gearshift shaft
26 swivel direction
28 shift direction
30 shift finger
32 shift finger
34 shift finger
36 shift finger
38 claw
40 claw
42 claw
44 claw
46 detent groove
48 ball element
50 claw
52 claw
54 claw
56 claw
58 claw
60 claw
62 transmission housing
70 opening
72 check disk
74 locking sleeve
76 gear teeth
78 opening
80 pin
82 locking sleeve
84 groove
86 locking sleeve
88 pin
90 groove

The invention claimed is:

1. A shifting device (2) for a multi-step transmission, with which several shift couplings arranged one behind another, each with a shifting sleeve, can alternately be engaged in each case via a shift rocker arm (4, 6, 8, 10), in that first form-enclosed elements (30, 32, 34, 36) are arranged on a swivelling and axially movable selector and gearshift shaft (24) in such manner that at predetermined swivel angles of the selector and gearshift shaft (24) in each case only one first form-enclosed element (30, 32, 34, 36) cooperates with one second form-enclosing element (38, 40, 42, 44) which is arranged on the shift rocker arm (4, 6, 8, 10), and in that by means of an axial displacement of the selector and gearshift shaft (24) a first shift rocker arm (4) is actuated, while during actuation other shift rocker arms (6, 8, 10) are locked in a neutral position by a locking device, wherein the locking device comprises a locking sleeve (66, 74, 82, 86) which is provided on the selector and gearshift shaft (24) for respective pairs of shift rocker arms (4, 6, 8, 10) and is connected rotationally fast to the selector and gearshift shaft (24) but can move axially on the selector and gearshift shaft (24), and on the first and other shift rocker arms (4, 6, 8, 10) there are arranged first locking means (50, 52, 54, 56), which cooperate with the locking sleeve (66, 74, 82, 86) and with second locking means (58, 60) in fixed arrangement in the transmission.

2. The shifting device (2) according to claim 1, wherein the locking sleeve (66, 74, 82, 86) has internal gear teeth, which can move axially in external gear teeth (68, 76) of the selector and gearshift shaft (24).

3. The shifting device (2) according to claim 1, wherein the locking sleeve (66, 74, 82, 86) has axial internal grooves (84, 90), in which a pin (80, 88) fixed on the selector and gearshift shaft (24) engages.

4. The shifting device (2) according to claim 1, wherein the first locking means (50, 52, 54, 56) and the second locking means (58, 60) have openings in which a check disk (64, 72) of the locking sleeve (66, 74, 82, 86) engages.

5. The shifting device (2) according to claim 4, wherein the check disk (64, 72) is of oval shape.

6. The shifting device (2) according to claim 1, wherein the second form-enclosing elements (38, 40, 42, 44) arranged on the shift rocker arms (4, 6, 8, 10) and the first locking means (50, 52, 54, 56) are in each respective case formed on the same component.

7. The shifting device (2) according to claim 1, wherein the second locking means (58, 60) are formed in fixed positions in a transmission housing (62).

8. The shifting device (2) according to claim 1, wherein the second locking means (58, 60) are arranged on covers that can be fixed on a transmission housing (62) and are accessible from outside the transmission.

* * * * *